UNITED STATES PATENT OFFICE.

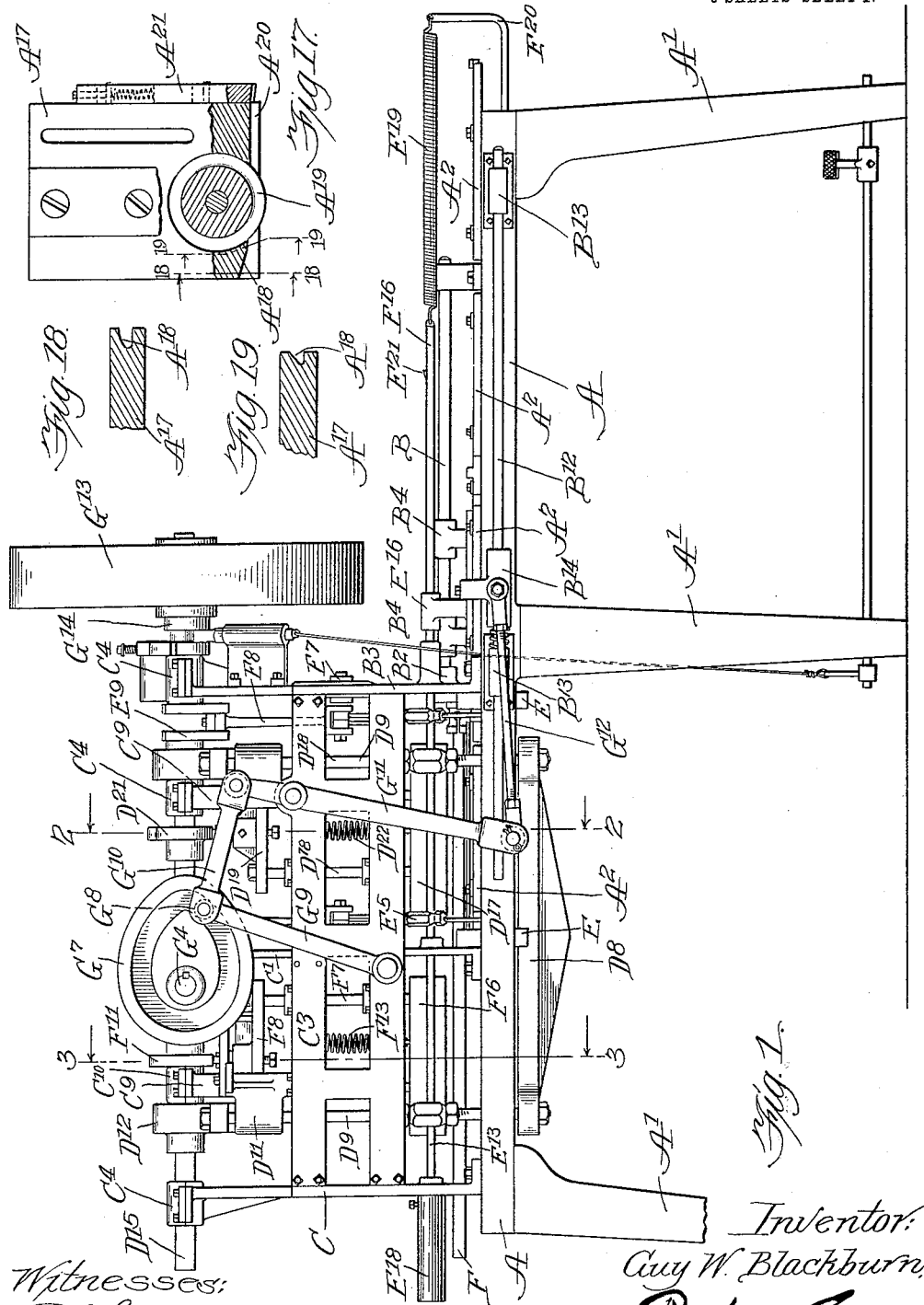

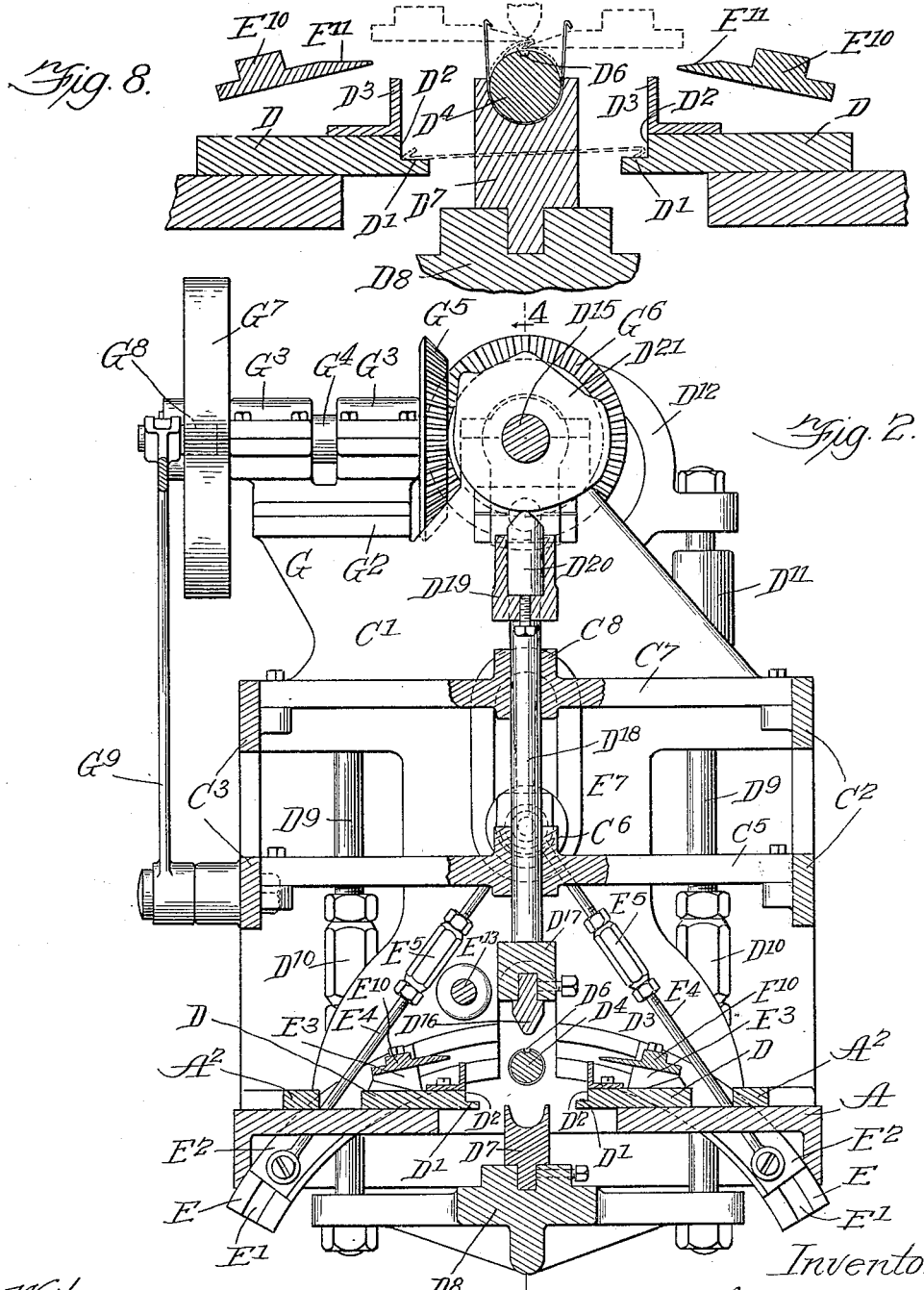

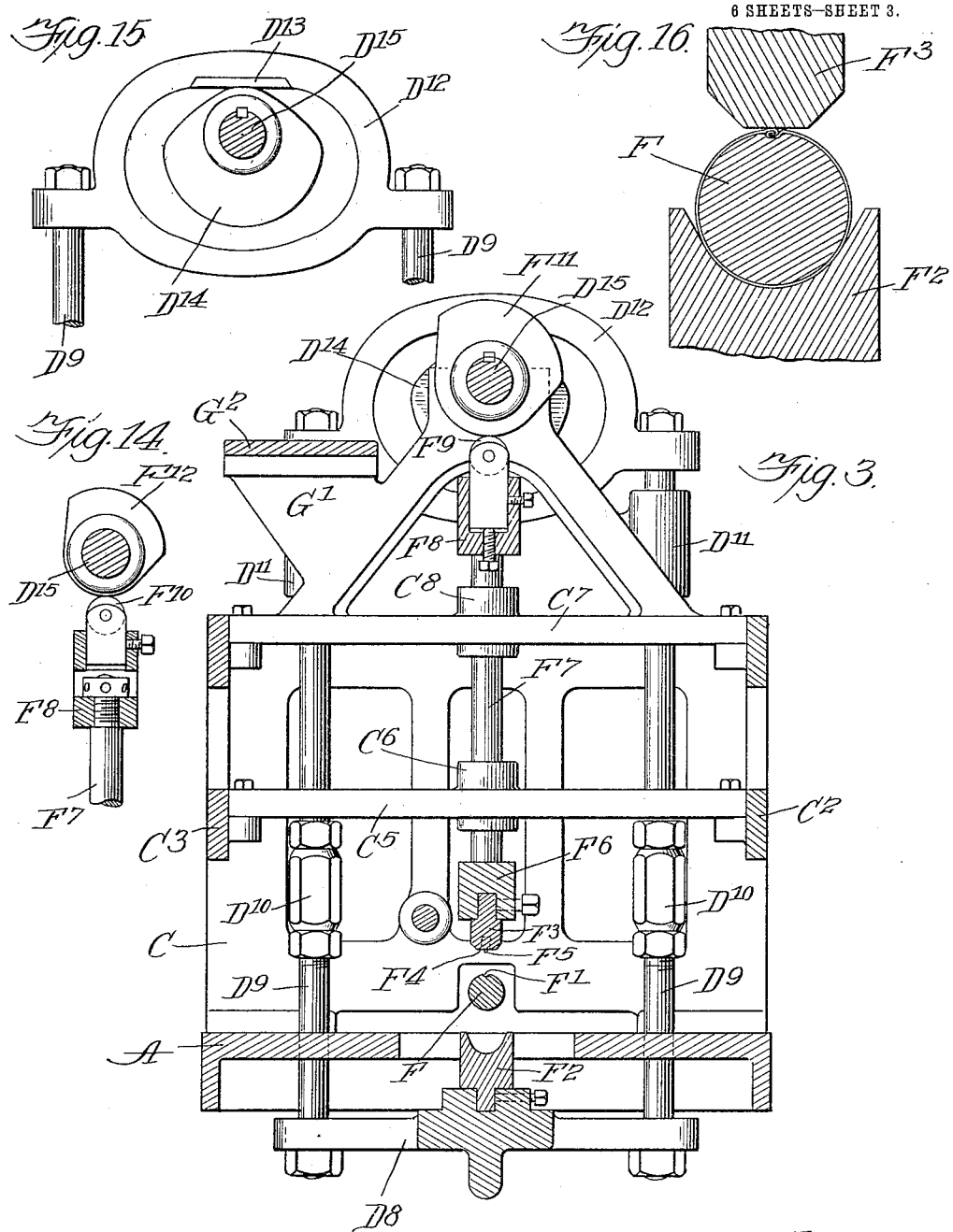

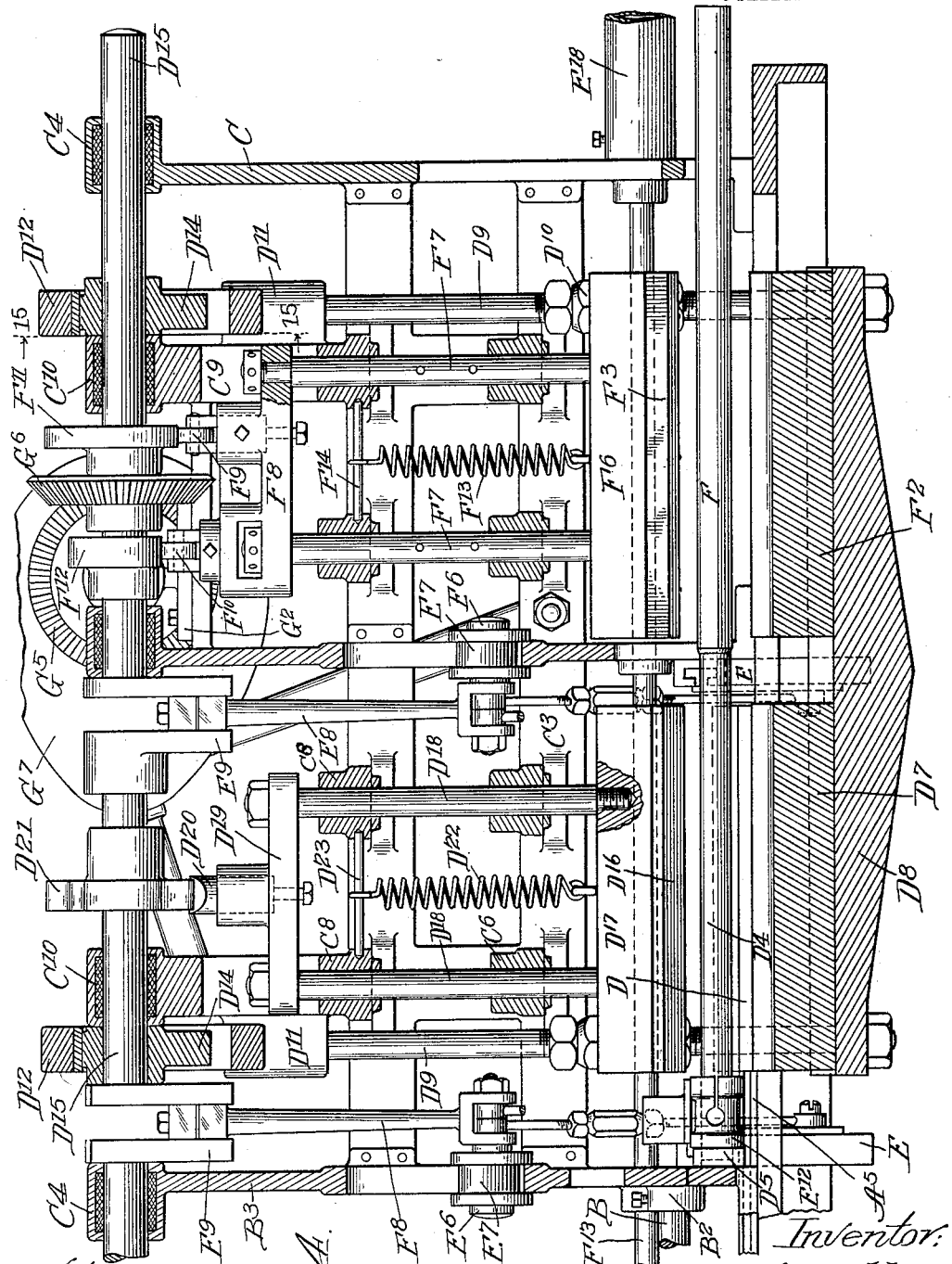

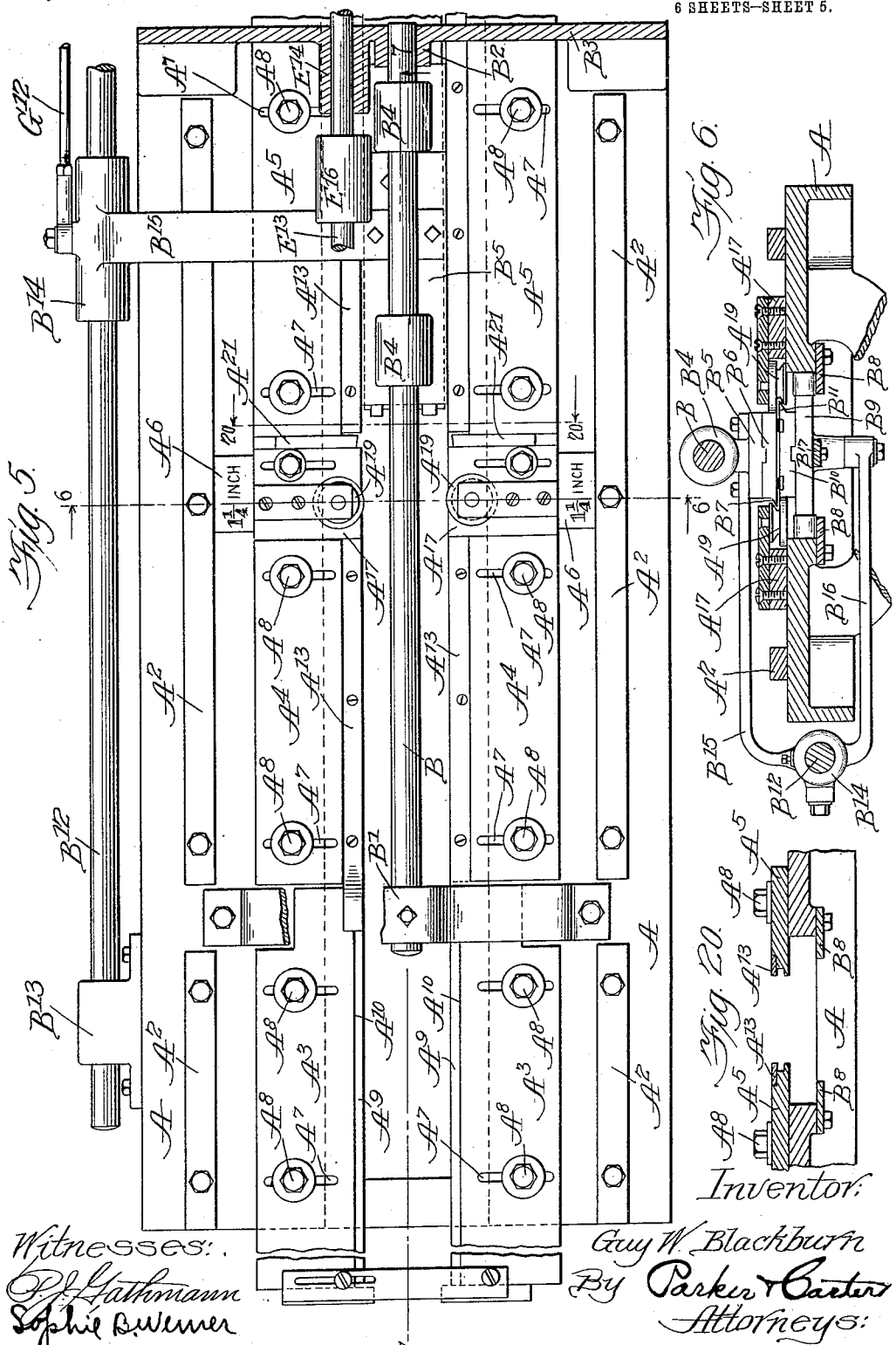

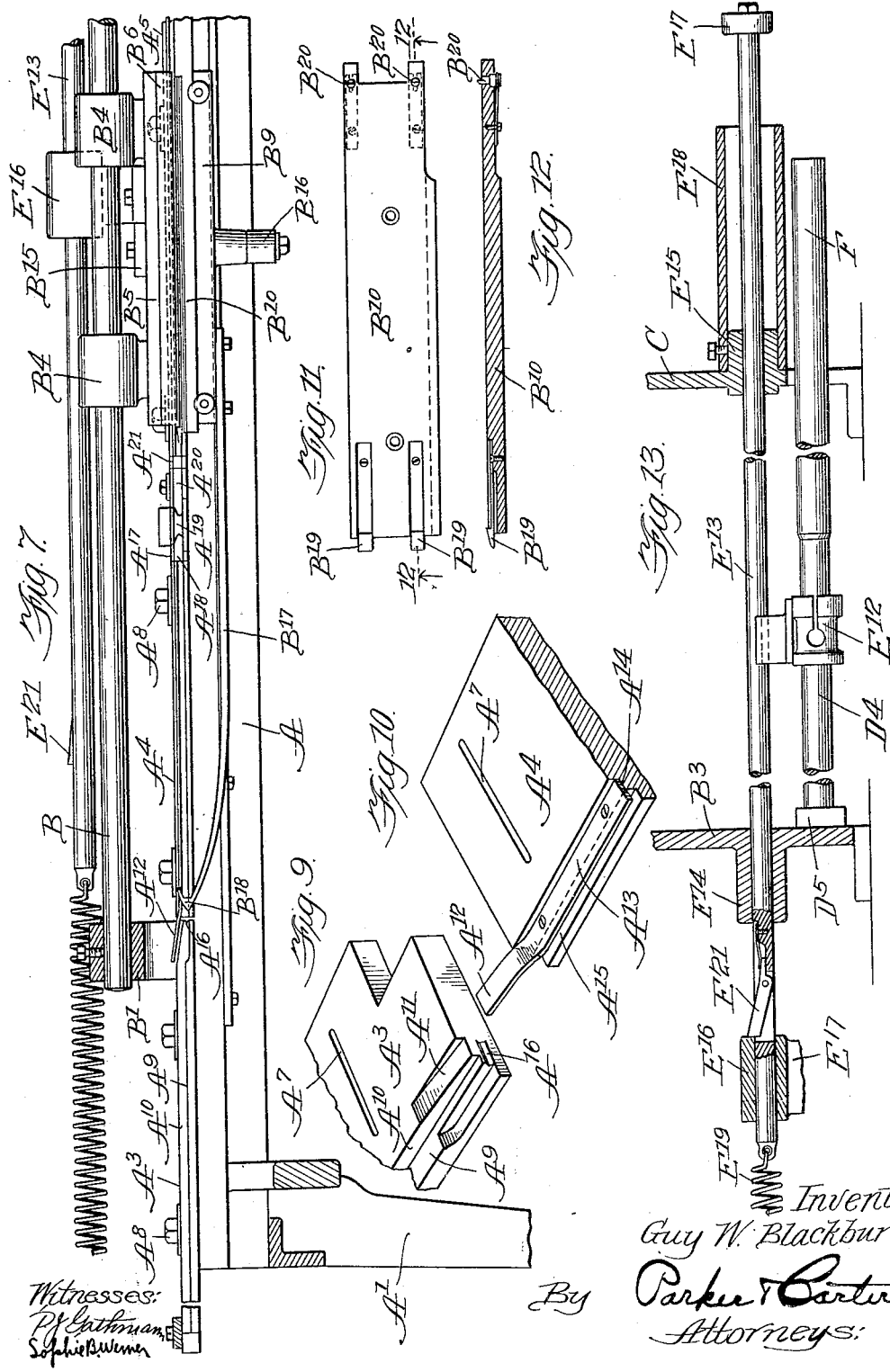

GUY W. BLACKBURN, OF ELGIN, ILLINOIS.

TUBE-FORMING MACHINE.

1,126,691.   Specification of Letters Patent.   Patented Feb. 2, 1915.

Application filed March 24, 1911. Serial No. 616,555.

*To all whom it may concern:*

Be it known that I, GUY W. BLACKBURN, a citizen of the United States, residing at Elgin, in the county of Kane and State of Illinois, have invented a certain new and useful Improvement in Tube-Forming Machines, of which the following is a specification.

My invention relates to improvements in tube forming machines and has for one object to produce a new and improved form thereof.

It is illustrated diagrammatically in one form in the accompanying drawings, wherein, Figure 1 is a side elevation of the machine; Fig. 2, a section along the line 2—2 of Fig. 1; Fig. 3, a section along the line 3—3 of Fig. 1; Fig. 4, a section along the line 2—2 of Fig. 2, on a larger scale; Fig. 5, a plan view of the feeding table; Fig. 6, a section along the line 6—6 of Fig. 5; Fig. 7, a section along the line 7—7 of Fig. 5; Fig. 8, an enlarged detail section of the locking mechanism taken from Fig. 2; Figs. 9 and 10, are perspective details of the guides taken from Fig. 5; Fig. 11, a detail plan view of the lower crimping die taken from Fig. 7; Fig. 12, a section along the line 12—12 of Fig. 11; Fig. 13, a detail in part section of the pusher rod and operating mechanism; Fig. 14, a section along the line 14—14 of Fig. 4; Fig. 15, a section along the line 15—15 of Fig. 4; Fig. 16, an enlarged detail section of the final locking mechanism; Fig. 17, a detail of the crimping roller; Fig. 18, a section along the line 18—18 of Fig. 17. Fig. 19, a section along the line 19—19 of Fig. 17; Fig. 20, a section along the line 20—20 of Fig. 5.

Like parts are indicated by like characters in all the figures.

The main frame A, which is mounted upon the legs $A^1$ carries the fixed parallel gage bars $A^2$ between which are located the adjustable parallel guides $A^3$ $A^4$ and $A^5$ which are all positioned with respect to the gage bars $A^2$ by the blocks $A^6$ and have the transverse slots $A^7$ to engage the holding bolts $A^8$. The guide bars $A^3$ have along their inner edges the bearing surfaces $A^9$ and guide surfaces $A^{10}$, at right angles one to the other, a portion of the upper surface of each guide bar $A^3$ being tapered off at $A^{11}$ in opposition to the upwardly inclined end $A^{12}$ of each guide strip $A^{13}$ which is mounted upon each bench $A^{14}$ on the guide bar $A^4$ to form the guiding groove $A^{15}$ in the edge of the guide strip $A^4$. The end of the guide strip $A^3$ which is adjacent to the guide strip $A^4$ is provided with the angular groove $A^{16}$ in opposition to the end of the slot $A^{15}$. The crimping plates $A^{17}$ are spaced by blocks $A^6$ with respect to the guide bars $A^2$ and provided on their adjacent sides with the curved and tapered guiding slots $A^{18}$ which extend to the truncated conical crimping rolls $A^{19}$ and are provided beyond said rolls with the angular guide slots $A^{20}$ in line with the guide grooves $A^{15}$ formed by the strips $A^{13}$ in the edge of the guide bars $A^5$. The spring actuated latch $A^{21}$ is interposed between the crimping plate $A^{17}$ and the guide bar $A^5$ and projects outwardly into the line of the grooves $A^{15}$.

The guide rail B which is supported at one end in the bracket $B^1$ on the table A and at the other end in the boss $B^2$ on the end frame $B^3$ is located above and between the guides $A^3$ $A^4$ and $A^5$ and carries, by means of the sliding bearings $B^4$ the carriage $B^5$ which in turn carries the flat die $B^6$ provided with the angular edge $B^7$ in opposition to one of the truncated conical rollers $A^{19}$. The tracks $B^8$ on the bottom of the frame support the carriage $B^9$ which carries the die $B^{10}$ in opposition to the die $B^6$ and provided with the angular edge $B^{11}$ in opposition to the other truncated conical roller $A^{19}$. The rail $B^{12}$ is mounted in the brackets $B^{13}$ on one side of the frame A and has slidably mounted thereon the sleeve $B^{14}$ which is rigidly connected to the carriage $B^5$ by the arm $B^{15}$ and to the carriage $B^9$ by the arm $B^{16}$. The carriage $B^9$ carries the outwardly and upwardly extending spring arm $B^{17}$, which terminates in the hook $B^{18}$, extending upwardly into the plane of the guide surfaces $A^9$ and the die $B^{10}$ carries at one end the spring hooks $B^{19}$ extending upwardly into the plane of the guide grooves $A^{15}$ and at the other end the spring actuated latch-lugs $B^{20}$.

The main frame A carries the open, upwardly extending transverse frames $B^3$ C and $C^1$ which are connected by the side frames $C^2$ and $C^3$ and which carry at their upper extremities the bearings $C^4$. The side frames $C^2$ $C^3$ are connected by the yokes $C^5$, having the perforated centrally located bosses $C^6$ and the side frames $C^3$ are also connected by the yokes $C^7$, which have the centrally located perforate bosses $C^8$ and carry the upwardly projecting frames $C^9$ which have at their upper extremity the bearings $C^{10}$ in line with the bearings $C^4$.

The guides D which are parallel with and form a continuation of the guides $A^5$ and are spaced in similar manner from the gage bars $A^2$ are provided with the horizontally disposed bearing surfaces $D^1$ and the vertically disposed upwardly extending guide surfaces $D^2$ which are extended above the surface of the guide D by the angles $D^3$ and are located on each side of and slightly below the forming mandrel $D^4$, which is removably and adjustably supported at one end only in the bracket $D^5$ on the end frame $B^3$ and is provided with the longitudinal groove $D^6$, the bracket $D^5$ being so arranged that the top line of the mandrel may be always at the same level independent of the diameter thereof. The semi-cylindrical die $D^7$ which reciprocates in opposition to a portion of the mandrel $D^4$ is mounted on the reciprocating table $D^8$. The table $D^8$ is supported at either end by the connecting rods $D^9$ which may be adjusted by means of the turn-buckles $D^{10}$ are slidably mounted in the sleeves $D^{11}$, on the A frames $C^9$ and are suspended from the yokes $D^{12}$ which have each the flat bearing surface $D^{13}$ in opposition to the cam $D^{14}$ keyed to the driving shaft $D^{15}$ in the bearings $C^4$ $C^{10}$. The angular die $D^{16}$ is carried by the reciprocating bar $D^{17}$, which in turn is carried by the connecting rods $D^{18}$ slidably mounted in the bosses $C^6$ and $C^8$ and connected at their upper extremities to the yoke $D^{19}$ which carries the tappet $D^{20}$ in opposition to the cam $D^{21}$ on the crank shaft $D^{15}$. The coil spring $D^{22}$ is attached at one end to the bar $D^{17}$ and at the other end to the rod $D^{23}$ carried in the bosses $C^6$ $C^8$ to resist the downward movement of the die $D^{16}$.

The curved tracks E, which are mounted upon the frame A at either end of the guides D, contain the curved T shaped guide slots $E^1$, in which are mounted upon either side of the machine the opposed arc shaped carriages $E^2$, held in position upon the track by the T slots, carrying at their opposed ends the lugs $E^3$ and pivotally carrying at their other ends the connecting rods $E^4$, adjustable by means of the turn-buckles $E^5$ and pivotally mounted upon the pins $E^6$ which project from the cross-heads $E^7$ slidably mounted in the frames $B^3$ and $C^1$ and driven by the connecting rods $E^8$ from the cranks $E^9$ on the drive shaft $D^{15}$. The bending strips $E^{10}$ are mounted at either end upon the lugs $E^3$ upon the carriages $E^2$ and have the opposed chisel edges adapted to overlap in a plane tangential to and slightly above the mandrel $D^4$ and to engage and interlock the opposed crimped edges of the blank, as indicated in Fig. 8 in dotted lines. The split collar $E^{12}$, which is in slidable engagement with the mandrel $D^4$ and reciprocates between the end frame $B^3$ and the frame $C^1$ is rigidly mounted upon the shaft $E^{13}$, which is slidably mounted in the boss $E^{14}$ on the end frame $B^3$ and the boss $E^{15}$, on the end frame C and in the bearing $E^{16}$ on the bracket $E^{17}$, on the carriage $B^4$ and is provided at one end with the plunger $E^{17}$ operating within the dash-pot $E^{18}$ and at the other end is controlled by the spring $E^{19}$, which is mounted upon the bracket $E^{20}$ on the main frame A. When the carriage $B^5$ reciprocates, being driven by the mechanism to be described later, it carries with it the bearing $E^{16}$ and when this bearing is at its extreme outermost position, it passes beyond the spring latch $E^{21}$. As it commences its return motion the latch is brought up against the end of the bearing and the rod $E^{13}$ is carried forward with this bearing at the same rate of speed as the carriage. However, as the bearing $E^{16}$ reaches the end of its motion, the spring latch $E^{21}$ is forced within the sleeve $E^{14}$ thus depressing the latch and allowing it to enter the bearing $E^{16}$. The rod $E^{13}$ is then drawn up to its original position by the coil spring.

The outer floating end of the mandrel $D^4$ is enlarged as at F between the end frames C and $C^1$ and is provided with the slot $F^1$ in continuation of the slot $D^6$. The semi-cylindrical die $F^2$ is mounted upon the table $D^8$ in opposition to the lower side of the mandrel F. The locking bumper $F^3$, which is provided with the flat surface $F^4$, tangential to the mandrel F, and in opposition to the slot $F^1$, and from which project the spaced locking pins $F^5$, is mounted in the reciprocating bar $F^6$, which is carried by the connecting rods $F^7$, slidably mounted in the bosses $C^6$ and $C^8$ and carried at their upper ends in the yoke $F^8$, from which project the roller tappets $F^9$ $F^{10}$ in opposition to the cams $F^{11}$ and $F^{12}$ on the driving shaft $D^{15}$. The return spring $F^{13}$ is interposed between the bar $F^6$ and the rod $F^{14}$ carried by the bosses $C^6$ $C^8$.

The brackets $G^1$ are mounted respectively upon the end frame $C^1$ and frame $C^9$ and carry the table $G^2$ upon which are carried the bearings $G^3$, supporting the cam shaft $G^4$, which is provided at one end with the miter gear $G^5$ in mesh with the miter gear $G^6$ on the drive shaft $D^{15}$ and at the other end with the slotted cam $G^7$, in which travels the guide pin $G^8$, carried by the connecting rod $G^9$, pivoted to the frame $C^3$ and carrying the link $G^{10}$, pivoted at its other end to the lever $G^{11}$, which is pivotally mounted on the frame $C^3$ and has its other end, the pivoted connecting rod $G^{12}$ also pivotally mounted upon the sleeve $B^{14}$. The driving pulley $G^{13}$ is rotatably mounted upon the shaft $D^{15}$ and is connected therewith by means of the clutch $G^{14}$ to operate the mechanism.

It will be evident that while I have shown in my drawings an operative device, still many changes might be made, both in size, shape and arrangement of parts, without departing materially from the spirit of my invention, and I wish, therefore, that my drawings be regarded as, in a sense diagrammatic.

The use and operation of my invention are as follows: A belt, not shown, drives from any suitable source of power, the driving pulley on the driving shaft, thus operating the machine. The flat metal blanks which are to be made into tubes are fed into the machine by placing them upon the bearing surfaces between the guide surfaces of the parallel guides on the main frame. The rotation of the drive shaft operates by means of the miter gear the flat slotted cam, thus reciprocating the die carriage. Each outward movement of the carriage brings the spring hooks carried thereby into engagement with the rearward edge of one of the blanks. The inward movement of the carriage draws this blank forward beneath the guide strips into the guide slots. The next outward movement of the carriage brings the dies on the carriage into opposition with either side of the blank, the return of the blank being prevented by the slot or groove in the edge of the guide. When the carriage starts its forward movement, the spring hooks on the lower die engage the rearward edge of the blank and carry it forward between the two crimping plates where its edges are slightly curled or bent to and beyond the crimping rolls which crimp or bend the edges against the angular side extension of the die. On the next outward movement of the carriage the blank is caught by the latch on the farther side of the crimping plate and drawn out from between the dies. The next forward movement of the carriage causes the spring actuated latch to engage the rearmost edge of the blank and carry it forward into the machine to a position in opposition to the mandrel and semi-cylindrical forming die. The rotation of the crank shaft lifts the reciprocating table by means of the cams on said shaft engaging the bearing surfaces on the yokes and brings the semi-cylindrical die up against the mandrel carrying with it the crimped blank and bending it as shown in Fig. 8. Meanwhile, however, the angular die has been depressed by its associate cams to bring it against the mandrel from above and prevent any springing of the free floating mandrel which is supported in the frame at one end alone at that time. As the shaft continues to rotate the semi-cylindrical die is still held in contact therewith while the angular die withdraws for a short distance. The rotation of the crank shaft then raises the cross edges and by means of the connecting rods or links draws the carriages around upon the curved tracks in such manner that the bending strips engage the blank as indicated in dotted lines in Fig. 8 and overlapping bring the crimped edges into opposition, one with the other. It will be observed that since the edges of the blank are but slightly crimped, they would not necessarily engage one another when brought into overlapping position by the bending strips and therefore the angular interlocking die which is used then descends and compresses the crimped edges, thus forcing them together and bringing them into a position more nearly parallel with the blank and causing them to interlock. It then withdraws, allowing the bending strips to withdraw. The reciprocating table then descends leaving the blank surrounding the mandrel and having its two edges slightly interlocked. The reciprocation of the die carriage meanwhile forces the slotted sleeve forward along the mandrel against the retracting spring, thus forcing the partially formed tube upon the forming mandrel where it is enlarged at its outmost end to the appropriate size. At the end of the stroke, the spring latch which controls the sleeve carrying rod and carriage is disengaged and the controlling spring is allowed to draw the sleeve back to its original position. The groove in the mandrel operates to prevent any rotation of the blank, owing to the fact that the crimped edges have a tendency to follow the grooved line. The table now again rises and engages the mandrel and the flat locking die descends and compresses the crimped edges of the die into the groove on the mandrel, thus locking them firmly together. The projecting pins punch slight depressions in the locked portion of the tube and provide a double security against disengagement. The next operation of the machine will bring forward a further partially formed tube and this tube will force the formed and locked tube off of the mandrel as it takes its place.

I claim:

1. In a machine for forming tubes the combination of a supporting frame with a tube former about which the body of the tube is to be formed and dies which move radially toward the former to form the tube about it, said dies adapted to operate with equal and opposite forces toward the tube simultaneously.

2. In a tube forming machine having a solid floating mandrel means for bending blanks into U shape about it and simultaneously operating means for steadying the mandrel while the bending process is taking place.

3. In a tube forming machine having a solid floating mandrel means for bending blanks into U shape about it and simultaneously operating means for steadying the mandrel, means for withdrawing said steadying means and means for interlocking the free edges of the blank.

4. In a tube forming machine having a floating mandrel means for bending blanks into U shape about it and simultaneously operating means for steadying the mandrel, means for withdrawing said steadying means, means for interlocking the free edges of the blank and means comprising said steadying means for slightly compressing the free interlocked edges.

5. In a tube forming machine a mandrel having parts of varying cross sectional area, means for bending blanks about the smaller part, separate means for slightly interlocking their edges, means for forcing the interlocked blank along the mandrel to the larger part and means for locking the edges upon the mandrel.

6. In a tube forming machine means for bending blanks into U shape about a mandrel and means comprising curved tracks, carriages reciprocating therein and blank engaging strips for bringing the free edges of said blanks together.

7. In a tube forming machine means for bending blanks into U shape about a mandrel and means comprising curved tracks, carriages reciprocating therein and carrying blank engaging strips for bringing the free edges of said blanks together and separate means for loosely interlocking said edges.

8. In a tube forming machine means for crimping the blanks and means for feeding the blanks to said crimping means, blank bending means, means for feeding the blanks from said crimping to said bending means, and means operating against the crimped edges for bringing them into engagement one with the other.

9. In a tube forming machine means for crimping the blanks and means for feeding the blanks to said crimping means, blank bending means and means for feeding the blanks from said crimping to said bending means, means operating against the crimped edges for bringing them into engagement one with the other locking means and means for feeding the blanks to said locking means.

10. In a tube forming machine a mandrel and means for bringing together the crimped edges of the blank thereabout and a supporting die and a bumper removed from said means for locking said edges together.

11. In a tube forming machine means for bringing together the crimped edges of the blank and means for locking them together comprising a mandrel a supporting die a bumper and a plurality of blank engaging pins projecting from said locking die in opposition to the joint in said blank.

12. In a tube forming machine a mandrel upon which the tubes are first loosely bent to form, then locked to size and shape and means for feeding the blanks along said mandrel, said means comprising a split slidably mounted collar upon the mandrel.

13. In a tube forming machine a removable blank engaging mandrel means independent of the size thereof for bending blanks upon said mandrel and means for fixing the top line of said mandrel with respect to said tube bending means.

14. A tube forming machine having feeding means, a removable forming and sizing mandrel, forming and locking means in connection therewith and means independent of the size of the mandrel for holding the top line of the mandrel fixed and means for varying the position of the forming and locking devices with respect to the mandrel.

15. In a tube forming machine a mandrel and edge engaging means traveling in a curved path tangential to said mandrel for bringing opposed edges of the blanks together.

16. In a tube forming machine a mandrel and edge engaging means operative tangentially to said mandrel for bringing opposed edges of the blanks together and additional means for loosely interlocking the crimped edges of said blanks.

17. In a tube forming machine comprising a mandrel and blank crimping and blank bending and interlocking devices, means comprising a locking die and pins projecting therefrom for locking the crimped members together.

18. In a tube forming machine frame guides upon which the blank travels, means for feeding the blank and crimping it during its travel a mandrel and means for bending the blank about the mandrel means for feeding the blank to said bending means, interlocking means operating subsequent to said bending means and locking means subsequently operative, and means for feeding the blank to said locking means.

19. In a tube forming machine a blank engaging mandrel, means for bending the blank about it and means operative in unison with said bending means for supporting the opposed side of the mandrel.

20. In a tube forming machine, a mandrel, radial means for locking the opposed edges of the tube blank together against it and means moving in unison with said locking means for supporting the opposed side of the mandrel.

21. A tube forming machine, a mandrel, a die for bending the tube blanks, thereabout, means on the opposed side of the mandrel for supporting it, and means for withdrawing said supporting means after the blank has been bent.

22. A tube forming machine, a mandrel, a die for bending the tube blanks thereabout, means on the opposed side of the mandrel for supporting it, means for withdrawing said supporting means after the blank has been bent, means for bending the opposed edges of said blank together and means comprising said supporting means for loosely interlocking them.

23. In a tube forming machine, a forming mandrel having cylindrical separated parts of different cross sectional areas, means for interlocking tube blanks about the smaller part and means for locking and forming said blanks about the larger part.

24. In a tube forming machine, a mandrel and means for bending blanks into U shape thereabout, and separate means comprising blank engaging fingers for drawing the opposed edges of the blank upwardly and inwardly about the mandrel.

25. In a tube forming machine, a mandrel and means for bending blanks into U shape thereabout, and separate means comprising blank engaging fingers traveling inwardly and upwardly toward the uppermost part of the mandrel for drawing the opposed edges of the blank upwardly and inwardly about the mandrel.

26. A tube forming machine, blank bending and interlocking means, means for feeding the blank thereto and can sizing and locking means and means for feeding the blank from the said bending means to said locking means.

27. A tube forming machine and mandrel, means for bending blanks into U shape thereabout and separate means operative before such U shape bending means have finished their operation for holding the free ends of the blank about the mandrel.

28. A tube forming machine and mandrel, means for bending blanks into U shape thereabout and means operative before such U shape bending means have finished their operation for folding the free ends of the blank about the mandrel, said means comprising fingers traveling in a curved path tangential to the uppermost surface of the mandrel.

29. In a tube forming machine, a mandrel having parts of fixed different cross sectional area, means for partially forming the tube about one of said parts and subsequently completing it about the other all of said means operating radially toward the mandrel.

30. In a tube forming machine, a mandrel and means for bending the tube about the mandrel, additional means for stretching and bending the free edges of the blank about the mandrel.

31. In a tube forming machine, a forming mandrel, means for bending, shaping and locking the blanks into cylindrical form about it, and means for radially supporting said mandrel during the time all of said means are operating, said radial supporting means being inoperative when the bending, shaping and locking means are inoperative.

32. In a machine for forming tubes the combination of a supporting frame with a tube forming mandrel about which the body of the tube is formed, a die which moves toward the mandrel to bend the blank about it and a die adapted to operate with equal and opposite force toward the mandrel free from the blank simultaneously with the blank bending die.

33. In a tube forming machine, a mandrel having parts of different cross sectional area, means for partially forming the tube about one of said parts and subsequently completing it about the other, said means comprising a plurality of dies reciprocating all of them to and from the mandrel in unison with equal and opposite force.

GUY W. BLACKBURN.

Witnesses:
FRANCIS W. PARKER, Jr.,
SOPHIE B. WERNER.

Copies of this patent may be obtained for five cents each, by addressing the "Commissioner of Patents, Washington, D. C."